United States Patent
Chu

(10) Patent No.: US 10,047,896 B2
(45) Date of Patent: Aug. 14, 2018

(54) TRIPOD SYSTEM AND METHOD

(71) Applicant: Oswald Chu, Edmonton (CA)

(72) Inventor: Oswald Chu, Edmonton (CA)

(*) Notice: Subject to any disclaimer, the term of this patent is extended or adjusted under 35 U.S.C. 154(b) by 0 days.

(21) Appl. No.: 15/786,595

(22) Filed: Oct. 17, 2017

(65) Prior Publication Data

US 2018/0163916 A1 Jun. 14, 2018

Related U.S. Application Data

(63) Continuation-in-part of application No. 15/377,301, filed on Dec. 13, 2016.

(51) Int. Cl.
| | |
|---|---|
| *F16M 11/00* | (2006.01) |
| *F16M 11/06* | (2006.01) |
| *F16M 11/16* | (2006.01) |
| *F16M 11/32* | (2006.01) |

(52) U.S. Cl.
CPC ............ *F16M 11/06* (2013.01); *F16M 11/16* (2013.01); *F16M 11/32* (2013.01)

(58) Field of Classification Search
CPC .............................. F16M 11/38; F16M 11/242
USPC ... 248/168, 177.1, 178.1, 179.1, 187.1, 434, 248/435
See application file for complete search history.

(56) References Cited

U.S. PATENT DOCUMENTS

| | | | |
|---|---|---|---|
| 4,017,152 A * | 4/1977 | Allen ..................... | G03B 21/58 248/165 |
| 6,305,653 B1 | 10/2001 | Oldham et al. | |
| 6,454,228 B1 | 9/2002 | Bosnakovic | |
| 6,983,916 B2 * | 1/2006 | Raynaud ............. | F16M 11/046 248/163.2 |
| 7,290,740 B2 | 9/2007 | Joy et al. | |
| 7,780,126 B2 | 7/2010 | Law et al. | |
| 7,974,004 B2 * | 7/2011 | Maruyama ............ | G03B 21/58 160/351 |
| 8,726,439 B2 | 5/2014 | Orzeck et al. | |
| 9,417,508 B2 * | 8/2016 | Yang .................... | F16M 11/041 |

(Continued)

FOREIGN PATENT DOCUMENTS

| | | |
|---|---|---|
| CN | 202794807 | 3/2013 |
| DE | 202004001225 | 4/2004 |

*Primary Examiner* — Steven M Marsh
(74) *Attorney, Agent, or Firm* — Integrity Patent Group, PLC; Edwin Wold

(57) ABSTRACT

A tripod system including clamp assembly, rod assembly, rod-hub, plurality of spoke-rods, plurality of corner-joints, plurality of screen-rods, plurality of storage-assembly-rods, plurality of storage assembly rods, and plurality storage assembly corners. Each of spoke-rods and screen-rods are adjustable in length. The tripod system configured to hold and maintain a screen. The clamp assembly is removably affixable to a tripod. The rod assembly includes first-end and a second-end, with rod assembly removably affixable to clamp assembly at first-end in a substantially horizontal plane. The rod-hub includes plurality of spoke-apertures, with the rod-hub affixable to second-end of the rod assembly and rotatable in relation to rod assembly. The plurality of spoke-rods insertable into the plurality of spoke-apertures of the rod-hub and the plurality of corner-joints removably affixable to the spoke-rods where the plurality of screen-rods removably affixable between two corner-joints.

20 Claims, 5 Drawing Sheets

(56) References Cited

U.S. PATENT DOCUMENTS

| | | |
|---|---|---|
| 2004/0257464 A1 | 12/2004 | Pandit et al. |
| 2007/0131825 A1* | 6/2007 | Skrodzki ................ F16M 11/10 248/177.1 |
| 2007/0235604 A1 | 10/2007 | Speggiorin |
| 2009/0095855 A1 | 4/2009 | Su |
| 2012/0227636 A1 | 9/2012 | Meadows et al. |

* cited by examiner

TRIPOD SYSTEM AND METHOD

CROSS-REFERENCE TO RELATED APPLICATION(S)

The present application is a Continuation-In-Part and is related to and claims priority to pending U.S. patent application Ser. No. 15/377,301 filed Dec. 13, 2016, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

Technical Field

The present invention relates generally to the field of supports of existing art and more specifically relates to a device to hold an article.

Related Art

A tripod is a portable three-legged frame, used as a platform for supporting the weight and maintaining the stability of some other object. A tripod provides stability against downward forces and horizontal forces and movements about horizontal axes. The positioning of the three legs away from the vertical center allows the tripod better leverage for resisting lateral forces. Tripods and similar multi-legged equipment are used in many applications, for example, in photography or holding and securing items. Usually tripods are bulky and heavy to carry along with other equipment. Also, tripods themselves may be limited in certain applications. A suitable solution is desired.

U.S. Pat. No. 7,780,126 to David Law relates to a modified tripod and "multi-pod" for cameras and other equipment. The described modified tripod and "multi-pod" for cameras and other equipment includes legs which fold into a very compact size that fit within the footprint of the camera, used for any type camera, e.g. compact point-and-shoot camera, camera phone, or SLR camera. The tripod can then live unnoticed on the bottom of the camera, until a shot requiring a tripod is needed. Then, the legs can be deployed to act as a firm stand. Another one of the main features of this tripod is that all the legs do not share a common end-point or pivot-point.

SUMMARY OF THE INVENTION

In view of the foregoing disadvantages inherent in the known support device art, the present disclosure provides a novel tripod system and method. The general purpose of the present disclosure, which will be described subsequently in greater detail, is to provide an efficient tripod system and method, which may be referred to as Tripodssibilites System and Method.

A tripod system is disclosed herein. The tripod system preferably includes a clamp assembly, a rod assembly, a rod-hub, a plurality of spoke-rods, a plurality of corner-joints, a plurality of screen-rods, a plurality of storage-assembly-rods, a storage assembly, a plurality of storage-assembly-rods, and a plurality of storage-assembly-corners. Each of the spoke-rods and the screen-rods are adjustable in length. The tripod system is configured to hold and maintain a screen.

The clamp assembly is removably affixable to a tripod. The rod assembly includes a first-end and a second-end, with the rod assembly removably affixable to the clamp assembly at the first-end in a substantially horizontal plane. The rod-hub includes a plurality of spoke-apertures, with the rod-hub affixable to the second-end of the rod assembly and rotatable in relation to the rod assembly. Also, the plurality of spoke-rods is insertable into the plurality of spoke-apertures of the rod-hub, and the plurality of corner-joints are removably affixable to the spoke-rods. The plurality of screen-rods is removably affixable between two corner-joints.

The storage assembly is configured to store the screen-rods, the corner-joints, the spoke-rods, the rod-hub, the rod assembly, and the clamp assembly; the storage assembly including a center-aperture. The plurality of storage-assembly-rods are insertable into the storage-assembly-corners and the storage-assembly-corners are insertable into a perimeter of the storage assembly to create a planar assembly, and the center-aperture is placeable upon a tripod to create a table.

According to another embodiment, a method of use for a tripod system is also disclosed herein. The method of use for a tripod system includes a first step, providing a tripod system (the system including screen-rods, corner-joints, spoke-rods, rod-hub, a rod assembly, and clamp assembly); a second step, providing a tripod; a third step, affixing the tripod system to the tripod; a fourth step, affixing a screen to the tripod system; a fifth step, removing the screen from the tripod system; and a sixth step, removing the tripod system from the tripod.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a tripod system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a support device to hold a particular article and more particularly to a tripod system as used to improve the ability of a user to display visual images of varying sizes upon a screen by the use of a tripod by a modular system.

Generally, a tripod system is affixable to a standard tripod. The system includes a variety of parts that are capable of being assembled in various manners to hold different types, shapes, and/or sizes of screens and/or banners. Additionally, the tripod system includes components and functionality that allow the system to be convertible into a table-like structure with the use of a tripod.

Referring now more specifically to the drawings by numerals of reference, there is shown in FIGS. 1-4, various views of a tripod system 100.

Figure 1:
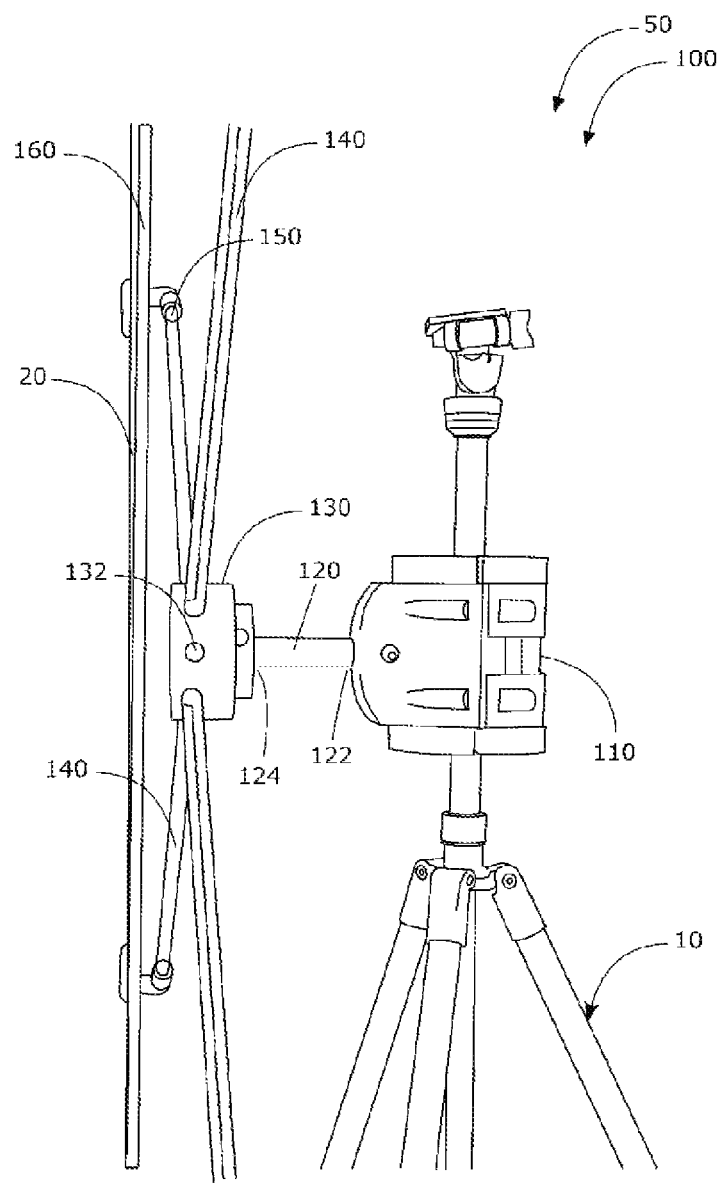
FIG. 1 is a perspective view of the tripod system during an 'in-use' condition, according to an embodiment of the disclosure.
Figure 3:
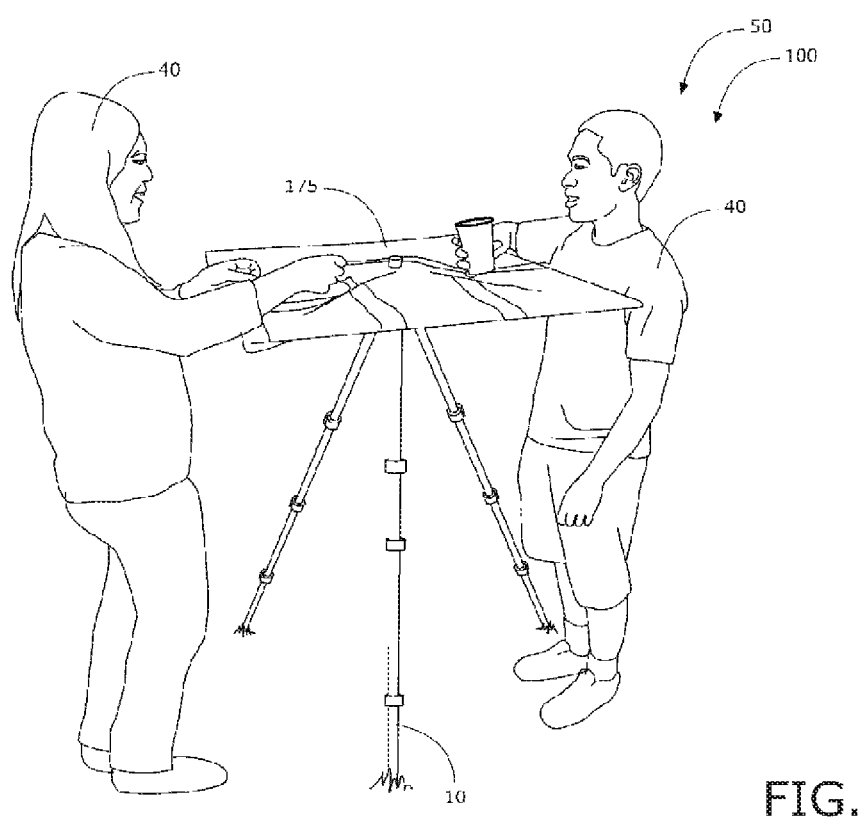
FIG. 3 is a perspective view of the tripod system of FIG. 1, according to an embodiment of the present disclosure.

FIG. 1 shows a tripod system, according to an embodiment of the present disclosure. Here, the tripod system 100 may be beneficial for use by a user 40 (as shown in FIG. 3) to provide a means to hold and maintain a banner and/or screen 20 with the use of tripod 10, as well as being adaptable to be convertible into a planar surface such that tripod system 100 and tripod 10 may be used as a table (also shown in FIG. 3). The screen 20 may be constructed of white pearl spandex, configured to be malleable, lightweight, and reflective. Also, the screen 20 may include elastic pararopes sown into the borders (i.e., edges, perimeter, etc.) such that the screen 20 is expandable. Further, the screen 20 may also be washable and include fire retardant capabilities. In addition to this, the screen 20 may be affixable to existing structures (e.g., wall, door, frame, structure, etc.) via hooks or other suitable fasteners.

As illustrated in FIGS. 1-4, the tripod system 100 may include clamp assembly 110, rod assembly 120, rod-hub 130, plurality of spoke-rods 140, plurality of corner-joints 150, plurality of screen-rods 160, plurality of storage-assembly-rods 170, storage assembly 180, plurality of storage-assembly-rods 170, and a plurality of storage-assembly-corners 172. Tripod system 100 may be configured to hold and maintain screen 20.

As shown, clamp assembly 110 may be removably affixable to tripod 10. Rod assembly 120 may include first-end 122 and second-end 124, with rod assembly 120 removably affixable to clamp assembly 110 at first-end 122 in a substantially horizontal plane. Rod-hub 130 may include a plurality of spoke-apertures 132, with rod-hub affixable 130 to second-end 124 of rod assembly 120.

As shown, plurality of spoke-rods 140 may be insertable into plurality of spoke-apertures 132 of rod-hub 130. Also, plurality of corner-joints 150 may be removably affixable to spoke-rods 140, and plurality of screen-rods 160 may be removably affixable between two corner-joints 150.

Figure 2:
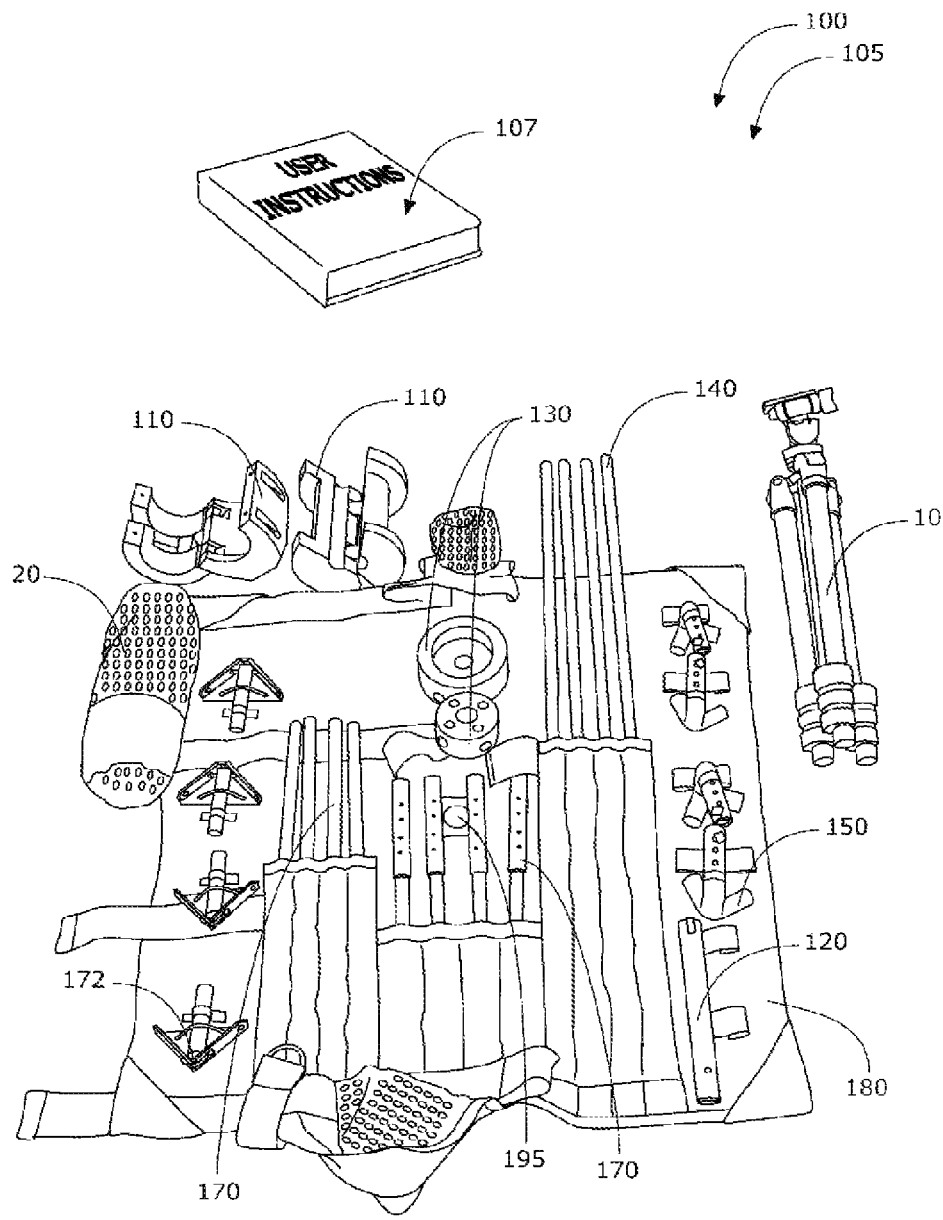
FIG. 2 is a perspective view of the tripod system of FIG. 1, according to an embodiment of the present disclosure.

Referring now more specifically to FIG. 2, storage assembly 180 may be configured to store screen-rods 160, corner-joints 150, spoke-rods 140, rod-hub 130, rod assembly 120, and clamp assembly 110, as well as storage assembly corners 172 and storage-assembly-rods 170. Embodiments may also include storage assembly 180 configured to hold and maintain screen 20 in a stored position (e.g., compact, rolled, etc.). Storage assembly 180 may further include center-aperture 195. Plurality of storage-assembly-rods 170 may be insertable into storage-assembly-corners 172, and storage-assembly-corners 172 may be insertable into a perimeter of storage assembly 180 to create planar assembly 175 (as shown in FIG. 3). As such, center-aperture 195 may be placeable upon tripod 10 to create a table (FIG. 3), in embodiments.

Figure 4:
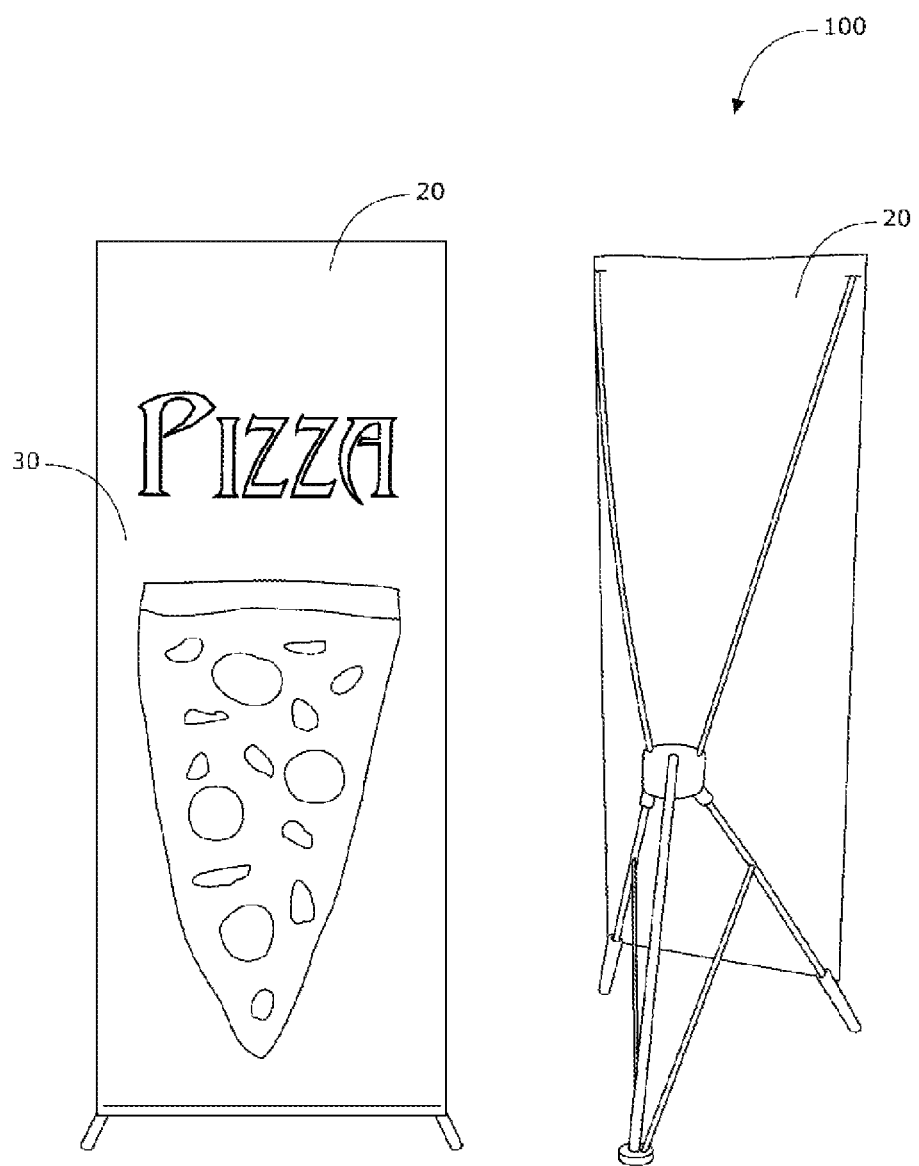
FIG. 4 is a perspective view of the tripod system of FIG. 1, according to an embodiment of the present disclosure.

Screen 20 may include the capability to display visible image 30 (visible image 30 shown in FIG. 4); visible image 30 may include an image provided from a projector, and/or printable upon screen 20. Similarly, screen 20 may include a projector screen, in some embodiments, or screen 20 may include flexible banner 60 (as seen in FIG. 4).

Screen 20 may be affixable to screen-rods 160 via clips, in some embodiments. Other embodiments may include screen 20 affixable to spoke-rods 160 via clips. Other fastening means may be used. Rod assembly 120 may be rotatable in relation to clamp assembly 110. Similarly, rod-hub 130 may be rotatable in relation to rod assembly 120. Also, each of spoke-rods 140 and screen-rods may be adjustable in length 160.

According to one embodiment, the tripod system 100 may be arranged as a kit 105. In particular, the tripod system 100 may further include a set of instructions 107. The instructions 107 may detail functional relationships in relation to the structure of the tripod system 100 such that the tripod system 100 can be used, maintained, or the like, in a preferred manner.

Figure 5:
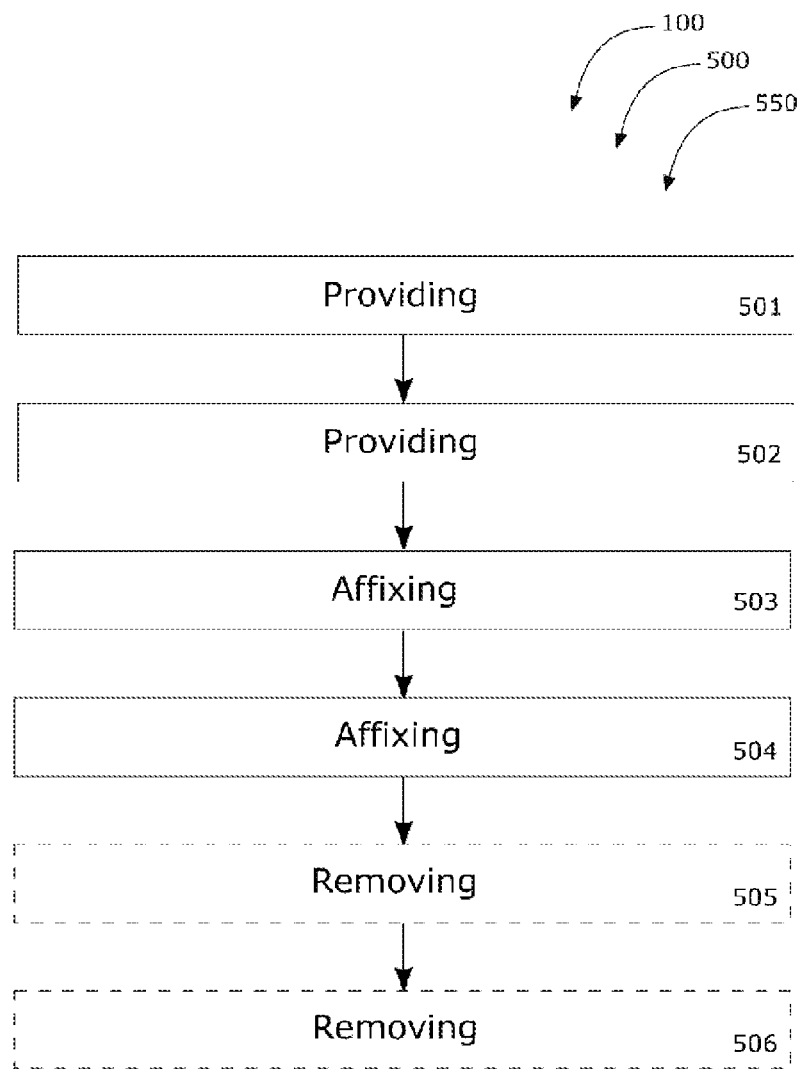
FIG. 5 is a flow diagram illustrating a method of use for the tripod system, according to an embodiment of the present disclosure.

FIG. 5 is a flow diagram 550 illustrating a method of use for 500 a tripod system 100, according to an embodiment of the present disclosure. In particular, the method of use 500 for a tripod system 100 may include one or more components or features of the tripod system 100 as described above. As illustrated, the method of use 500 for a tripod system 100 may include the steps of: step one 501, providing tripod system 100 (tripod system 100 including screen-rods 160, corner-joints 150, spoke-rods 140, rod-hub 130, rod assembly 120, and clamp assembly 110); step two 502, providing tripod 10; step three 503, affixing tripod system 100 to tripod 10; step four 504, affixing screen 20 to tripod system 100; step five 505, removing screen 20 from tripod system 100; and step six 506, removing tripod system 100 from tripod 10.

It should be noted that step five 505 and step six 506 are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other method of use for a tripod system [NOTE: e.g., different step orders within above-mentioned list, elimination or addition of certain steps, including or excluding certain maintenance steps, etc.], are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A tripod system, the system comprising:
   a clamp assembly, said clamp assembly removably affixable to a tripod;
   a rod assembly, including a first-end and a second-end, said rod assembly removably affixable to said clamp assembly at said first-end in a substantially horizontal plane;
   a rod-hub, including a plurality of spoke-apertures, said rod-hub affixable to said second-end of said rod assembly;
   a plurality of spoke-rods, said plurality of spoke-rods insertable into said plurality of spoke-apertures of said rod-hub;
   a plurality of corner-joints, said plurality of corner-joints removably affixable to said spoke-rods; and
   a plurality of screen-rods, said plurality of screen-rods removably affixable between two corner-joints;
   a plurality of storage-assembly-rods; and
   a storage assembly, said storage assembly configured to store said screen-rods, said corner-joints, said spoke-rods, said rod-hub, said rod assembly, and said clamp assembly; and
   wherein said tripod system is configured to hold and maintain a screen.

2. The system of claim 1, wherein said system further includes a plurality of storage-assembly-rods and storage-assembly-corners.

3. The system of claim 2, wherein said plurality of storage-assembly-rods are insertable into said storage-assembly-corners and said storage-assembly-corners are insertable into a perimeter of said storage assembly to create a planar assembly.

4. The system of claim 3, wherein said storage assembly further includes a center-aperture.

5. The system of claim 4, wherein said center-aperture is placeable upon a tripod to create a table.

6. The system of claim 1, wherein said screen includes capability to display a visible image.

7. The system of claim 6, wherein said visible image includes an image provided from a projector.

8. The system of claim 6, wherein said visible image is printable upon said screen.

9. The system of claim 1, wherein said screen is constructed from white pearl spandex, said screen including elastic pararopes affixed to a perimeter, said screen including properties such that said screen is flexible, washable, and flame retardant.

10. The system of claim 1, wherein said screen includes a flexible banner.

11. The system of claim 1, wherein said screen is affixable to said screen-rods via clips.

12. The system of claim 1, wherein said screen is affixable to said spoke-rods via clips.

13. The system of claim 1, wherein said rod assembly is rotatable in relation to said clamp assembly.

14. The system of claim 1, wherein said rod-hub is rotatable in relation to said rod assembly.

15. The system of claim 1, wherein said spoke-rods are adjustable in length.

16. The system of claim 1, wherein said screen-rods are adjustable in length.

17. A tripod system, the system comprising:
   a clamp assembly, said clamp assembly removably affixable to a tripod;
   a rod assembly, including a first-end and a second-end, said rod assembly removably affixable to said clamp assembly at said first-end in a substantially horizontal plane;
   a rod-hub, including a plurality of spoke-apertures, said rod-hub affixable to said second-end of said rod assembly;
   a plurality of spoke-rods, said plurality of spoke-rods insertable into said plurality of spoke-apertures of said rod-hub;
   a plurality of corner-joints, said plurality of corner-joints removably affixable to said spoke-rods;
   a plurality of screen-rods, said plurality of screen-rods removably affixable between two corner-joints;
   a plurality of storage-assembly-rods;
   a storage assembly, said storage assembly configured to store said screen-rods, said corner-joints, said spoke-rods, said rod-hub, said rod assembly, and said clamp assembly, said storage assembly including a center-aperture;
   a plurality of storage-assembly-rods; and
   a plurality of storage-assembly-corners;
   wherein said tripod system is configured to hold and maintain a screen;
   wherein said plurality of storage-assembly-rods are insertable into said storage-assembly-corners and said storage-assembly-corners are insertable a perimeter of said storage assembly to create a planar assembly;
   wherein said center-aperture is placeable upon a tripod to create a table;
   wherein said rod-hub is rotatable in relation to said rod assembly;
   wherein said spoke-rods are adjustable in length; and
   wherein said screen-rods are adjustable in length.

18. The system of claim 17, further comprising set of instructions; and
   wherein the system is arranged as a kit.

19. A method of use for the tripod system of claim 17, the method comprising the steps of:
   providing a tripod system, said system including screen-rods, corner-joints, spoke-rods, rod-hub, a rod assembly, and a clamp assembly;
   providing a tripod;
   affixing said tripod system to said tripod; and
   affixing a screen to said tripod system.

20. The method of claim 19, further comprising the steps of:
   removing said screen from said tripod system; and
   removing said tripod system from said tripod.

* * * * *